United States Patent
Shen

(10) Patent No.: US 10,424,987 B2
(45) Date of Patent: Sep. 24, 2019

(54) PROTECTIVE STRUCTURE OF STATOR AND FAN USING THE SAME

(71) Applicant: ASIA VITAL COMPONENTS CO., LTD., New Taipei (TW)

(72) Inventor: Ching-Hang Shen, New Taipei (TW)

(73) Assignee: Asia Vital Components Co. Ltd., New Taipei (TW)

( * ) Notice: Subject to any disclaimer, the term of this patent is extended or adjusted under 35 U.S.C. 154(b) by 165 days.

(21) Appl. No.: 15/373,467

(22) Filed: Dec. 9, 2016

(65) Prior Publication Data
US 2018/0166941 A1    Jun. 14, 2018

(51) Int. Cl.
| | |
|---|---|
| H02K 5/02 | (2006.01) |
| H02K 1/14 | (2006.01) |
| H02K 3/18 | (2006.01) |
| H02K 11/00 | (2016.01) |
| H02K 7/14 | (2006.01) |
| F04D 29/02 | (2006.01) |
| F04D 25/06 | (2006.01) |

(52) U.S. Cl.
CPC ........... *H02K 5/02* (2013.01); *F04D 25/0646* (2013.01); *F04D 29/023* (2013.01); *H02K 1/14* (2013.01); *H02K 3/18* (2013.01); *H02K 7/14* (2013.01); *H02K 11/0094* (2013.01)

(58) Field of Classification Search
CPC .. H02K 5/02; H02K 1/14; H02K 3/18; H02K 7/14; H02K 11/0094; F04D 25/0646; F04D 29/023
See application file for complete search history.

(56) References Cited

U.S. PATENT DOCUMENTS

| | | | |
|---|---|---|---|
| 6,278,207 B1 * | 8/2001 | Matsumoto | ........... F04D 29/083 310/68 R |
| 6,870,292 B2 | 3/2005 | Owada et al. | |
| 7,635,934 B2 * | 12/2009 | Zhu | ........ F04D 29/582 310/88 |
| 8,480,385 B2 * | 7/2013 | Wu | ...... F04D 25/0613 361/695 |

(Continued)

FOREIGN PATENT DOCUMENTS

| | | |
|---|---|---|
| CN | 101783537 A | 7/2010 |
| CN | 202772736 U | 3/2013 |

(Continued)

*Primary Examiner* — Emily P Pham
(74) *Attorney, Agent, or Firm* — C. G. Mersereau; DeWitt LLP

(57) ABSTRACT

The present invention relates to a protective structure of a stator and a fan using the same. The protective structure of a stator comprises plural silicon steel sheets, at least one first filler, and a cover body. The silicon steel sheets are surrounded by plural coils. Each of the silicon steel sheets has a hole and plural magnetic poles extending symmetrically outward from the hole. Each of two adjacent magnetic poles defines a space. The first filler is disposed in the spaces. The cover body is disposed to surround the silicon steel sheets such that the cover body, the silicon steel sheets, and the first filler are integrally combined. Therefore, by means of the first filler disposed in the spaces of each of two adjacent magnetic poles, the amount of cover body material can be effectively reduced to further achieve the effect of cost reduction.

7 Claims, 6 Drawing Sheets

(56) References Cited

U.S. PATENT DOCUMENTS

| | | | |
|---|---|---|---|
| 9,057,380 B2* | 6/2015 | Lin | F04D 25/062 |
| 10,084,356 B2* | 9/2018 | Horng | H02K 7/14 |
| 10,110,085 B2* | 10/2018 | Lin | H02K 1/04 |
| 2005/0012416 A1* | 1/2005 | Huang | F04D 25/06 |
| | | | 310/88 |
| 2013/0307361 A1* | 11/2013 | Lai | H02K 5/16 |
| | | | 310/90 |

FOREIGN PATENT DOCUMENTS

| | | |
|---|---|---|
| TW | 200724788 | 7/2007 |
| TW | 201225484 A1 | 6/2012 |

* cited by examiner

PROTECTIVE STRUCTURE OF STATOR AND FAN USING THE SAME

BACKGROUND OF THE INVENTION

Field of the Invention

The present invention relates to a protective structure of a stator and in particular to a protective structure and a fan using the same which can achieve the effect of cost reduction.

Description of Prior Art

Please refer to FIGS. 1A-1C, which show the prior art stator structure with waterproof and dustproof functions, applied to a fan 2. The stator structure 1 comprises a plurality of silicon steel sheets 10 and a waterproof glue layer 11. There are plural coils 12 surrounding the silicon steel sheets 10. A hole 101 is formed at the center of each of the silicon steel sheets 10. A plurality of magnetic poles 103 extend outward from the hole 103; a space 104 is formed between each of two adjacent magnetic poles 103. The waterproof glue layer 11 is disposed in the spaces 104 and covers the silicon steel sheets 10. That is, the waterproof glue layer 11 is filled to the silicon steel sheets 10 and into the spaces 104 by injection such that the respective spaces 104 are filled with the waterproof glue layer 11 and the silicon steel sheets 10 are thus covered. Therefore, the waterproof glue layer 11 enables the stator to effectively achieve the functions of waterproof and dustproof.

Besides, the above-mentioned fan 2 comprises a frame 21, a fan wheel 22, and a stator set (i.e., the stator structure 1). The frame 21 has a receiving space 211 receiving the fan wheel 22. A sleeve 212 protrudes from the center of the frame 21. The fan wheel 22 has a shaft 221 sleeved by the sleeve 212 correspondingly. A plurality of blades 223 is disposed along the perimeter of the fan wheel 22. The structure and connecting relationship of the stator set are the same as those of the above-mentioned stator structure 1 and are not described here again.

However, though the prior art technology has the effects of waterproof and dustproof, another problem occurs. That is, the spaces 104 between each of two adjacent magnetic poles 103 cause the liquid glue, which is used to form the waterproof glue layer 11, to have to be filled into the spaces 104 in advance when the silicon steel sheets 10 are integrally formed by injection molding using a mold (not shown). Then, the liquid glue covers the silicon steel sheets 10 such that the waterproof glue layer 11 is formed on the outsides of the silicon steel sheets 10. Consequently, the material consumption of the waterproof glue layer 11 increases and thus the cost rises.

Besides, when the prior art stator is recycled, the classification of recycling in response to environmental protection causes the recycling company to spend more time and manpower detaching violently the waterproof glue layer 11 integrally formed on the outsides of the silicon steel sheets 10 and the inside and outside of the spaces 104. Then, the sequential recycling process continues. As a result, the redundant manpower and time cost are incurred.

Based on the above description, the prior art technology suffers the following disadvantages.
1. The cost increases.
2. The redundant manpower and time cost are spent.

How to solve the problems and disadvantages of the above prior art is the target which the industry and the inventor strive to reach.

SUMMARY OF THE INVENTION

Thus, to effectively overcome the above problems, it is one objective of the present invention to provide a protective structure of a stator which effectively achieves cost reduction by means of plural first fillers received in the spaces defined by each of two adjacent magnetic poles.

It is another objective of the present invention to provide a protective structure of a stator which decreases the material amount of the cover body.

It is yet another objective of the present invention to provide a protective structure of a stator which has the effects of waterproof, dustproof, and salt spray resistance.

It is yet another objective of the present invention to provide a fan which achieves cost reduction.

To achieve the above objective, the present invention provides a protective structure of a stator, which comprises a plurality of silicon steel sheets, at least one first filler, and a cover body. The silicon steel sheets are surrounded by a plurality of coils. Each of the silicon steel sheets has a hole and a plurality of magnetic poles which extend symmetrically outward from the hole. A space is defined by each of two adjacent magnetic poles. The first filler is received in the spaces. The cover body is disposed to surround the silicon steel sheets such that the cover body, the silicon steel sheets, and the first filler are integrally combined. Therefore, the present invention can effectively achieve cost reduction by means of the integral design of the silicon steel sheets, the first filler, and the cover body.

The present invention also provides a fan which comprises a fan wheel, a frame, and a stator set. The fan wheel has a shaft and a plurality of blades disposed along the perimeter of the fan wheel. The frame has a receiving space to receive the fan wheel. A sleeve is formed at the center of the frame and is pivoted to the shaft corresponding to the fan wheel.

The stator set is sleeved around the sleeve and comprises a plurality of silicon steel sheets, at least one first filler, and a cover body. The silicon steel sheets are surrounded by a plurality of coils. Each of the silicon steel sheets has a hole and a plurality of magnetic poles extending symmetrically outward from the hole. A space is defined by each of two adjacent magnetic poles to receive the first filler.

The cover body is disposed surrounding the silicon steel sheets such that the cover body, the silicon steel sheets, and the first filler are integrally combined. Therefore, by means of the first filler disposed in the spaces of each of two adjacent magnetic poles, the material amount of the cover body can be effectively decreased to further achieve the effect of cost reduction.

DETAILED DESCRIPTION OF THE INVENTION

The above objectives, the structural and functional characteristics of the present invention will be described according to the preferred embodiments with the accompanying figures.

Figure 1A:
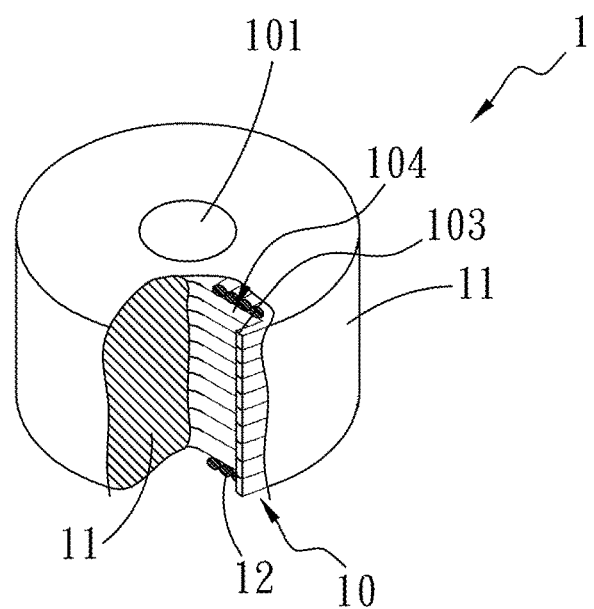
FIG. 1A is a local cross-sectional view of the prior art stator structure.
Figure 1B:
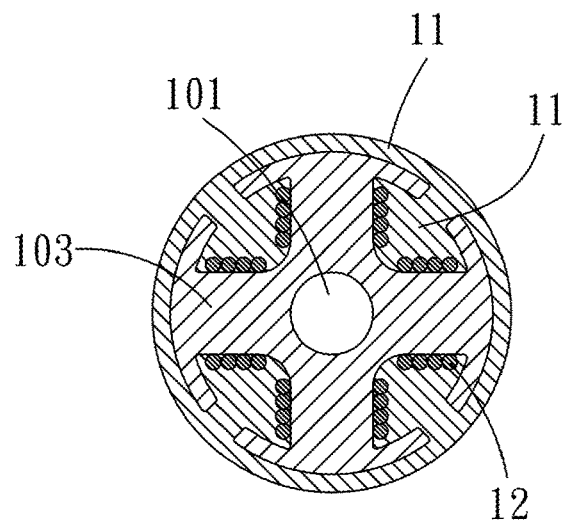
FIG. 1B is a top cross-sectional view of the prior art stator structure.
Figure 1C:
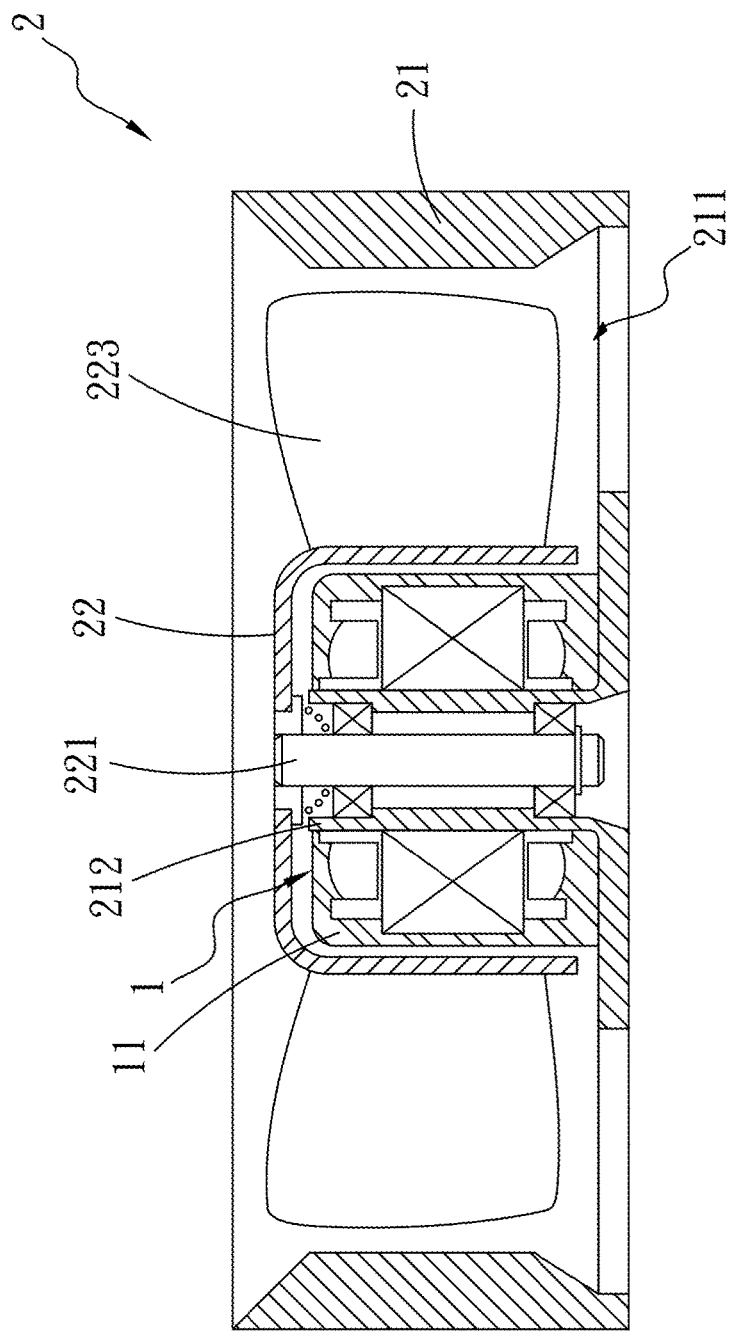
FIG. 1C is a schematic view of the implementation of the prior art fan.
Figure 2A:
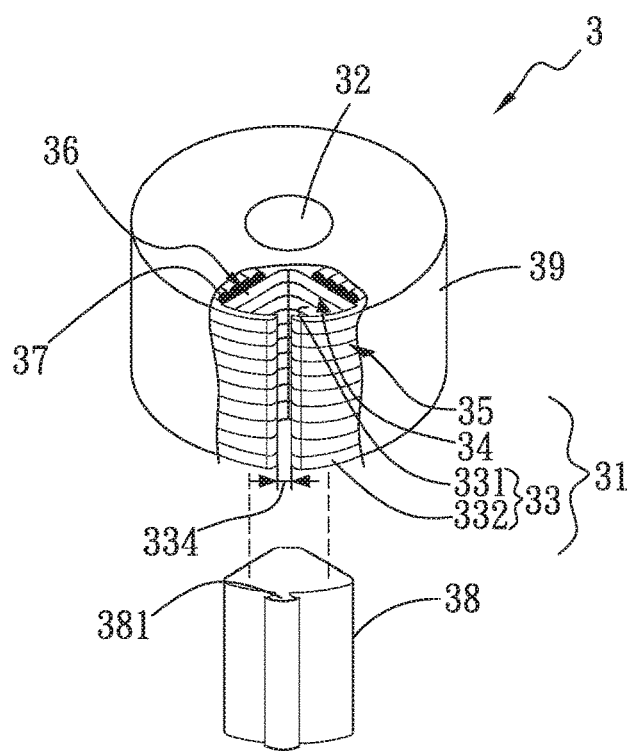
FIG. 2A is a local cross-sectional view of the protective structure of a stator according to the first preferred embodiment of the present invention.
Figure 2B:
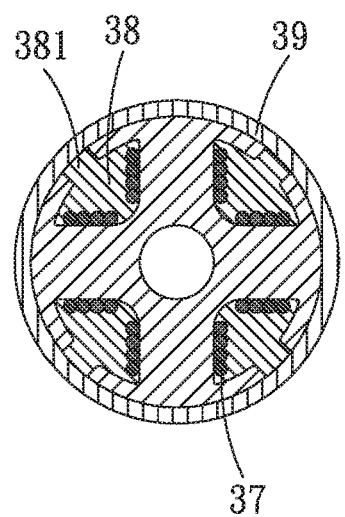
FIG. 2B is a top cross-sectional view of the protective structure of a stator according to the first preferred embodiment of the present invention.

Please refer to FIGS. 2A and 2B, which show a protective structure of a stator and a fan using the protective structure of the present invention. In the first preferred embodiment of the present invention, the protective structure of the stator 3 comprises a plurality of silicon steel sheets 31, at least one first filler 38, and a cover body 39. The silicon steel sheets 31 are surrounded by a plurality of coils 37. Each of the silicon steel sheets 31 has a hole 32 and a plurality of magnetic poles 33 extending symmetrically outward from the hole 32. (That is, the magnetic poles 33 extend outward along the hole 32 and are symmetrically constructed). A space 36 is defined by each of two adjacent magnetic poles 33 and is used to receive the above-mentioned first filler 38. In short, the first filler 38 is received in the respective spaces 36 correspondingly such that the outside of the first filler 38 is firmly attached to the insides of the spaces 36.

In addition, each of the magnetic poles 33 has an extension portion 331 and an expansion portion 332 with a radial surface. The magnetic pole 33 extends outward to form one end of the extension portion 331 and the other end of the extension portion 331 is connected to form the expansion portion 332. The extension portions 331 are overlapped to form a magnetic post 34 (refer to FIG. 2A); the expansion portions 332 are overlapped to form the magnetic end surface 35 (refer to FIG. 2A).

A gap 334 is formed between each of two adjacent expansion portions 332 and communicates with the spaces 36 correspondingly. The first filler 38 has a protrusion 381 protruding from the first filler 38 to the corresponding gap 334 to be received in the gaps 334.

Besides, the cover body 39 covers the outsides of the silicon steel sheets 31 such that the cover body 39, the silicon steel sheets 31, and the first filler 38 are integrally combined. That is, the cover body 39 is integrally formed by injection to cover the magnetic post 34, the magnetic end surface 35, and the first filler 38 to form the above-mentioned protective structure of the stator 3. Thus, the protective structure of the stator 3 of the present invention uses the cover body 39 to achieve the effects of waterproof, dustproof, and salt spray resistance.

Moreover, during the manufacturing process, a mold (not shown) is used only to fill the liquid glue onto the outsides of the silicon steel sheets 31 to cover the silicon steel sheets 31 and the first filler 38 received in the spaces 36. The above-mentioned cover body 39 is then formed on the silicon steel sheets 31 after mold stripping. By means of the first filler 38 filled in the spaces 36, the material amount of the cover body 39 is effectively decreased to further achieve cost reduction.

Also, because the cover body 39 is only formed to cover the silicon steel sheets 31 and there is no liquid glue filled in the spaces 36, when the recycling company is performed the recycling classification, the cover body 39 can be separated from the silicon steel sheets 31 quickly to effectively reduce the time of recycling classification. Thus, the manpower cost can be effectively saved.

Figure 3:
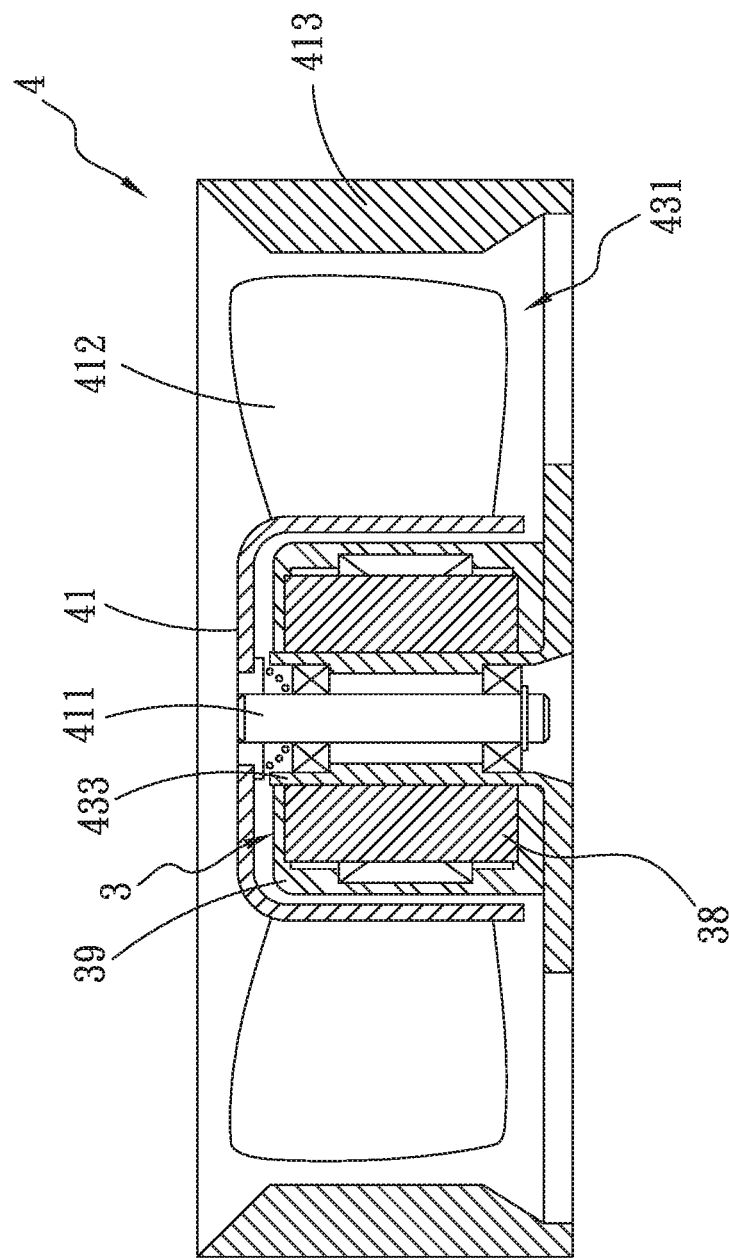
FIG. 3 is a cross-sectional view of the fan according to the first preferred embodiment of the present invention.
Figure 4:
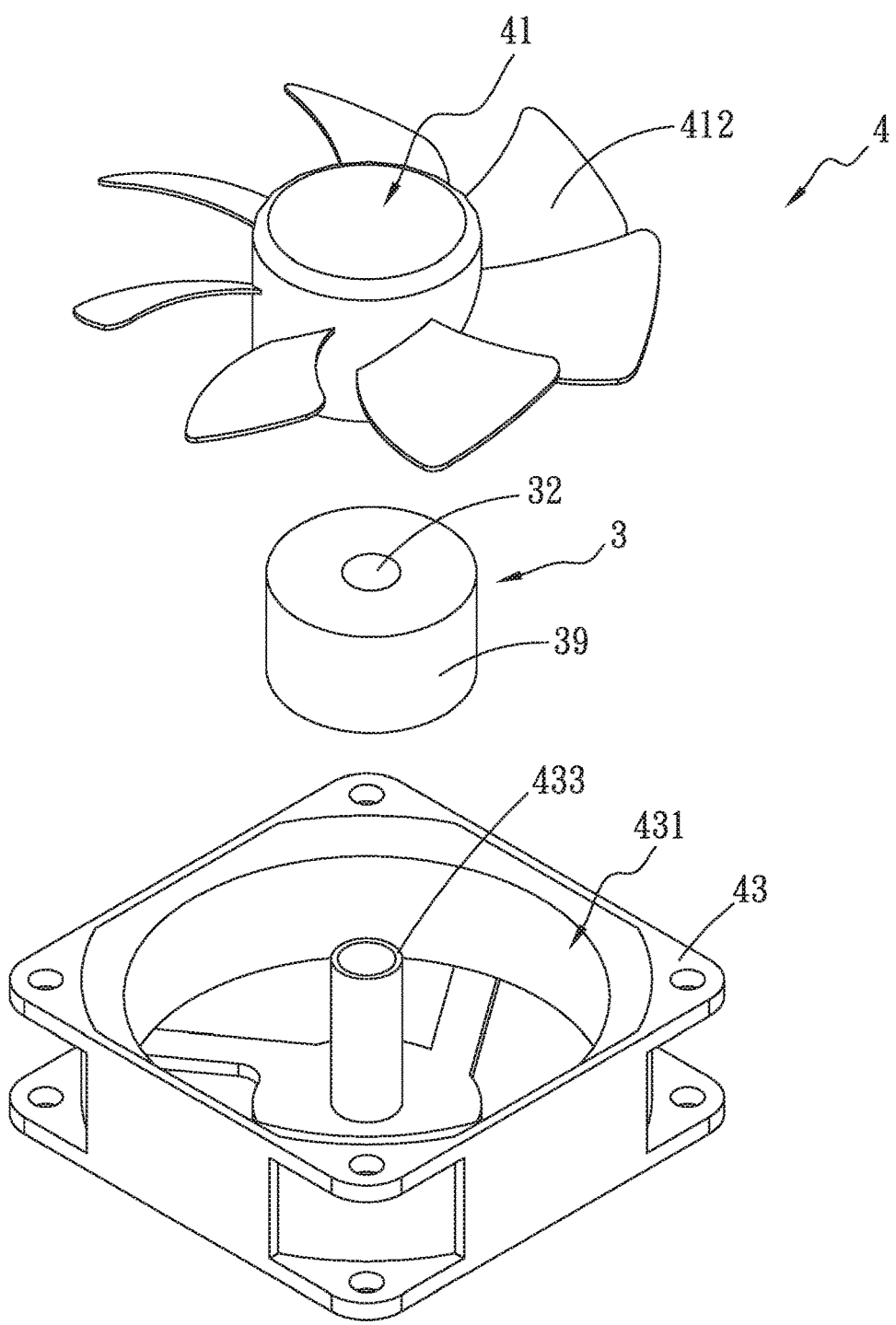
FIG. 4 is an exploded perspective view of the fan according to the first preferred embodiment of the present invention.

Please continue to refer to FIGS. 3 and 4, accompanying with FIGS. 2A and 2B. In the current preferred embodiment, the protective structure of the stator 3 is applied to the fan 4. The fan 4 comprises a fan wheel 41, a frame 43, and a stator set (i.e., the above-mentioned protective structure of the stator 3). The fan wheel 41 has a shaft 411 and a plurality of blades 412. One end of the shaft 411 is fixed to the fan wheel 41. The blades 412 are disposed along the perimeter of the fan wheel 41. The above-mentioned frame 43 has a receiving space 431 to receive the fan wheel 41. A sleeve 433 is formed at the center of the frame 43 and is pivoted to the other end of the shaft 411 corresponding to the fan wheel 41.

The hole 32 of the above-mentioned stator set (i.e., the above-mentioned protective structure of the stator 3) is sleeved around the sleeve 433. The whole structure, the effects and the connecting relationship of the stator set are the same as those of the above-mentioned protective structure of the stator 3 and are not described here again.

When the fan 4 rotates or stops, the cover body 39 is used to keep the moisture or dust from permeating into the stator set, which can effectively prevent the silicon steel sheets 31 and the coils 37 in the stator set from being corroded and damaged (e.g., the silicon steel sheets 31 or the coils 37 are rusted). Therefore, by means of the integral design of the silicon steel sheets 31, the first filler 38, and the cover body 39 in the present invention, the stator set can be protected well to achieve the effects of waterproof, dustproof, and salt spray resistance and further to achieve cost reduction.

Figure 5:
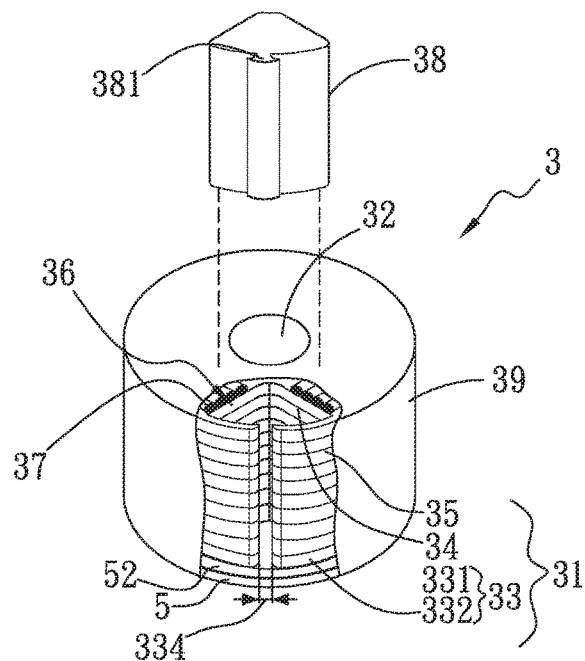
FIG. 5 is a local cross-sectional view of the protective structure of a stator according to the second preferred embodiment of the present invention.

Please refer to FIG. 5, which is a local cross-sectional view of the protective structure of a stator according to the second preferred embodiment of the present invention. The structure and connecting relationship of the second preferred embodiment are basically the same as those of the first preferred embodiment and are not described here again. The difference between the first and the second preferred embodiments is that, in the second preferred embodiment, the silicon steel sheets 31 are connected to a circuit board 5; a gap 51 is defined between the circuit board 5 and the silicon steel sheets 31 to receive at least one second filler 52 such that the outside of the second filler 52 is firmly attached to the inside of the gap 51. That is, two outsides of the second filler 52 are individually firmly attached to the silicon steel sheets 31 and one side of the circuit board 5.

Besides, the cover body 39 covers the outsides of the silicon steel sheets 31 and the circuit board 5 such that the cover body 39, the silicon steel sheets 31, the first filler 38, the second filler 52, and the circuit board 5 are integrally combined. That is, the above-mentioned cover body 39 is integrally formed by injection to cover the magnetic post 34, the magnetic end surface 35, the first filler 38, the second filler 52, and the circuit board 5 to form the above-mentioned protective structure of the stator 3. Therefore, by means of the cover body 39 in the present invention, the foreign body such as water, dust, or salt spray can be prevented from permeating into the circuit board 5 and the silicon steel sheets 31 and the oxidation of the silicon steel sheets 31 can be effective prevented.

Figure 6:
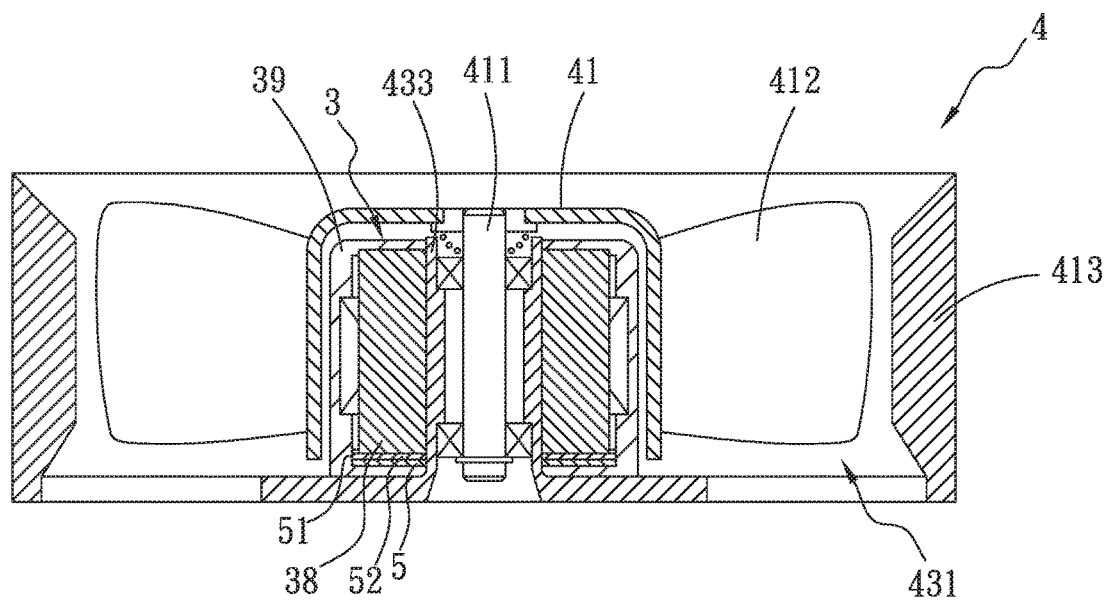
FIG. 6 is a cross-sectional view of the fan according to the second preferred embodiment of the present invention.

Please continue to refer to FIG. 6, which shows a cross-sectional view of the fan according to the second preferred embodiment of the present invention in which the protective structure of the stator 3 according to the second preferred embodiment in FIG. 5 is applied to the fan 4. The structure and connecting relationship of the fan 4 in the second preferred embodiment are roughly similar to those in the first preferred embodiment and are not described here again.

In summary, compared with the prior art, the present invention has the following advantages.

1. The cost decreases.
2. The time of recycling classification and the manpower decrease.
3. The effects of waterproof, dustproof, and salt spray resistance are achieved.
4. The oxidation of the silicon steel sheets 31 is prevented.

The embodiments described above are only preferred ones of the present invention. All the equivalent modifications and variations using the methods, shapes, structures, and apparatus in the specification and figures of the present invention should be embraced by the claimed scope of the present invention.

What is claimed is:

1. A protective structure of a stator, comprising:
   a plurality of silicon steel sheets surrounded by a plurality of coils, wherein each of the plurality of the silicon steel sheets has a hole and a plurality of magnetic poles extending symmetrically outward from the hole, wherein a space is defined by each of two adjacent magnetic poles;
   at least one first filler received in the space; and
   a cover body disposed surrounding the plurality of the silicon steel sheets such that the cover body, the plurality of the silicon steel sheets, and the first filler are integrally combined.

2. The protective structure of the stator according to claim 1, wherein each of the plurality of the magnetic poles has an extension portion and an expansion portion, wherein said each of the plurality of the magnetic poles extends outward to form one end of the extension portion and the other end of the extension portion is connected to form the expansion portion, wherein the extension portions of the plurality of the magnetic poles are overlapped to form a magnetic post, wherein the expansion portions of the plurality of the magnetic poles are overlapped to form a magnetic end surface.

3. The protective structure of the stator according to claim 2, wherein a gap is formed between each of two adjacent expansion portions and communicates with the space.

4. The protective structure of the stator according to claim 3, wherein the first filler has a protrusion protruding from the first filler toward the gap to be received in the gap.

5. The protective structure of the stator according to claim 2, wherein the cover body is integrally formed by injection molding to cover the magnetic post, the magnetic end surface, and the first filler.

6. The protective structure of the stator according to claim 2, wherein the plurality of the silicon steel sheets are connected to a circuit board, wherein a gap is defined between the circuit board and the plurality of the silicon steel sheets to receive at least one second filler, wherein the cover body covers outsides of the plurality of the silicon steel sheets and the circuit board such that the cover body, the plurality of the silicon steel sheets, the first filler, the second filler, and the circuit board are integrally combined.

7. The protective structure of the stator according to claim 6, wherein the cover body is integrally formed by injection molding to cover the magnetic post, the magnetic end surface, the first filler, the second filler, and the circuit board.

\* \* \* \* \*